United States Patent
Lai et al.

(10) Patent No.: US 11,324,048 B2
(45) Date of Patent: May 3, 2022

(54) METHOD FOR MITIGATING INTERFERENCE IN A COMMUNICATIONS APPARATUS AND A COMMUNICATIONS APPARATUS UTILIZING THE SAME

(71) Applicant: MEDIATEK INC., Hsin-Chu (TW)

(72) Inventors: Yu-Ming Lai, Hsinchu (TW);
Kai-Hsiang Yang, Hsinchu (TW);
Wen-Ying Chien, Hsinchu (TW);
Tsai-Yuan Hsu, Hsinchu (TW);
Yu-Hsien Chang, Hsinchu (TW);
Yu-Ming Wen, Hsinchu (TW);
Ying-Che Hung, Hsinchu (TW);
Pei-Wen Hung, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/904,519

(22) Filed: Jun. 17, 2020

(65) Prior Publication Data
US 2020/0413448 A1    Dec. 31, 2020

Related U.S. Application Data

(60) Provisional application No. 62/868,016, filed on Jun. 28, 2019.

(51) Int. Cl.
*H04W 74/08* (2009.01)
*H04B 17/318* (2015.01)
(Continued)

(52) U.S. Cl.
CPC ...... *H04W 74/0825* (2013.01); *H04B 17/318* (2015.01); *H04B 17/336* (2015.01); *H04W 24/10* (2013.01); *H04W 74/0816* (2013.01)

(58) Field of Classification Search
CPC ............ H04W 74/0825; H04W 24/10; H04W 74/0816; H04W 52/243; H04B 17/318;
(Continued)

(56) References Cited

U.S. PATENT DOCUMENTS

| 2010/0246468 A1* | 9/2010 | Santhanam | H04W 4/02 370/312 |
| 2011/0009060 A1* | 1/2011 | Hsu | H04B 1/7136 455/41.2 |

(Continued)

FOREIGN PATENT DOCUMENTS

| CN | 104202065 A | 12/2014 |
| CN | 105144772 A | 12/2015 |
| CN | 107925889 A | 4/2018 |

OTHER PUBLICATIONS

Jing Zhu et al., Multi-Radio Coexistence: Challenges and Opportunities, 2007 IEEE, pp. 358-364, IEEE, USA, XP031136890, 2007.

*Primary Examiner* — Ivan O Latorre
(74) *Attorney, Agent, or Firm* — Winston Hsu

(57) ABSTRACT

A communications apparatus includes a plurality of communications circuits and a coexistence management circuit. Each communications circuit is configured to provide wireless communications services in compliance with a protocol. The coexistence management circuit is configured to manage radio activities of the communications circuits. In response to a detection result of at least two radio activities to occur in a subsequent packet time, the coexistence management circuit is configured to determine whether an interference signal related to said at least two radio activities falls in a predetermined frequency band, and when the interference signal falls in the predetermined frequency band, the coexistence management circuit is configured to
(Continued)

adjust a transmission power or an execution time of one of said at least two radio activities.

17 Claims, 12 Drawing Sheets

(51) Int. Cl.
*H04B 17/336* (2015.01)
*H04W 24/10* (2009.01)

(58) Field of Classification Search
CPC ...... H04B 17/336; H04B 1/10; H04B 1/1027; H04B 1/40
See application file for complete search history.

(56) References Cited

U.S. PATENT DOCUMENTS

| | | | | |
|---|---|---|---|---|
| 2012/0034891 A1* | 2/2012 | Chen | .................. | H04L 27/0008 455/214 |
| 2012/0040715 A1* | 2/2012 | Fu | ....................... | H04B 1/1027 455/553.1 |
| 2012/0182896 A1* | 7/2012 | Jang | .................... | H04W 72/085 370/252 |
| 2012/0250673 A1* | 10/2012 | Ko | ..................... | H04W 74/0816 370/349 |
| 2012/0327869 A1* | 12/2012 | Wang | ................. | H04W 72/1215 370/329 |
| 2014/0036882 A1* | 2/2014 | Baghel | ................. | H04B 1/1027 370/336 |
| 2014/0221028 A1* | 8/2014 | Desai | ................... | H04B 10/693 455/501 |
| 2015/0036514 A1* | 2/2015 | Zhu | ..................... | H04W 52/244 370/252 |
| 2015/0111610 A1* | 4/2015 | Hwang | ............. | H04W 72/1215 455/553.1 |
| 2015/0133185 A1* | 5/2015 | Chen | ................. | H04W 72/1215 455/552.1 |
| 2015/0327269 A1* | 11/2015 | Kim | .................... | H04W 74/004 370/329 |
| 2016/0337904 A1* | 11/2016 | Hsu | ....................... | H04W 8/205 |
| 2017/0208476 A1* | 7/2017 | Khambekar | ........... | H04W 4/021 |
| 2018/0013500 A1* | 1/2018 | Liao | ....................... | H04W 68/02 |
| 2018/0352554 A1* | 12/2018 | Flynn | ................. | H04W 72/082 |
| 2019/0342065 A1* | 11/2019 | Padaki | ................. | H04L 1/0003 |

\* cited by examiner

METHOD FOR MITIGATING INTERFERENCE IN A COMMUNICATIONS APPARATUS AND A COMMUNICATIONS APPARATUS UTILIZING THE SAME

CROSS REFERENCE TO RELATED APPLICATIONS

This application claims the benefit of U.S. Provisional Application No. 62/868,016 filed 2019 Jun. 28, the entirety of which is incorporated by reference herein.

BACKGROUND

With advancements in communications techniques, mobile stations (MS, which may be interchangeably referred to as user equipment (UE)) are now capable of handling multiple radio access technologies (RAT), such as at least two of GSM/GPRS/EDGE (Global System for Mobile Communications/General Packet Radio Service/Enhanced Data rates for Global Evolution), W-CDMA (Wideband Code Division Multiple Access), Wi-Fi (Wireless Fidelity), Bluetooth, LTE (Long Term Evolution), LTE Advanced, 5G New Radio (NR) or the like via one communications apparatus.

Generally, different RATs operate indifferent frequency bands. However, some of them may still operate in a frequency band that is close to or even overlaps with the operating band of other RATs.

Besides the condition of close or overlapped operating band, when a communications apparatus capable of simultaneously providing more than one RAT communications, inter-modulation (IM) or inter-modulation distortion (IMD) may occur. The IMD is the amplitude modulation of signals containing two or more different frequencies in a system with nonlinearities. The inter-modulation between each frequency component will form additional signals at frequencies that are not just at harmonic frequencies (integer multiples) of either, but also at the sum and difference frequencies of the original frequencies and at multiples of those sum and difference frequencies. When the undesired IMD signal falls within a forbidden frequency band or a downlink frequency band utilized by the other RAT, it becomes undesired interference and the communications apparatus may be unable to pass the certification requirement (for example, the Federal Communications Commission (FCC) certification requirement) of one or more countries and/or the receiving (RX) performance of the communications apparatus may be severely degraded.

In order to solve these problems, a communications apparatus capable of providing simultaneous multi-RAT communications with intelligent interference mitigation or avoidance is required.

SUMMARY

It is one object of the present invention to solve the problems of failure in the certification requirement of one or more countries due to the undesired IMD signal caused by multiple transmissions and the RX performance degradation due to simultaneous transmission and reception.

According to an embodiment of the invention, a communications apparatus comprises a plurality of communications circuits and a coexistence management circuit. Each communications circuit is configured to provide wireless communications services incompliance with a protocol. The coexistence management circuit is configured to manage radio activities of the communications circuits. In response to a detection result of at least two radio activities to occur in a subsequent packet time, the coexistence management circuit is configured to determine whether an interference signal related to said at least two radio activities falls in a predetermined frequency band, and when the interference signal falls in the predetermined frequency band, the coexistence management circuit is configured to adjust a transmission power or an execution time of one of said at least two radio activities.

According to another embodiment of the invention, a method for mitigating interference in a communications apparatus comprising a plurality of communications circuits each being configured to provide wireless communications services in compliance with a protocol, the method comprising: detecting whether at least two radio activities to occur in a subsequent packet time; in response to a detection result of at least two radio activities to occur in the subsequent packet time, determining whether an interference signal related to said at least two radio activities falls in a predetermined frequency band; and when the interference signal falls in the predetermined frequency band, adjusting a transmission power or an execution time of one of said at least two radio activities.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
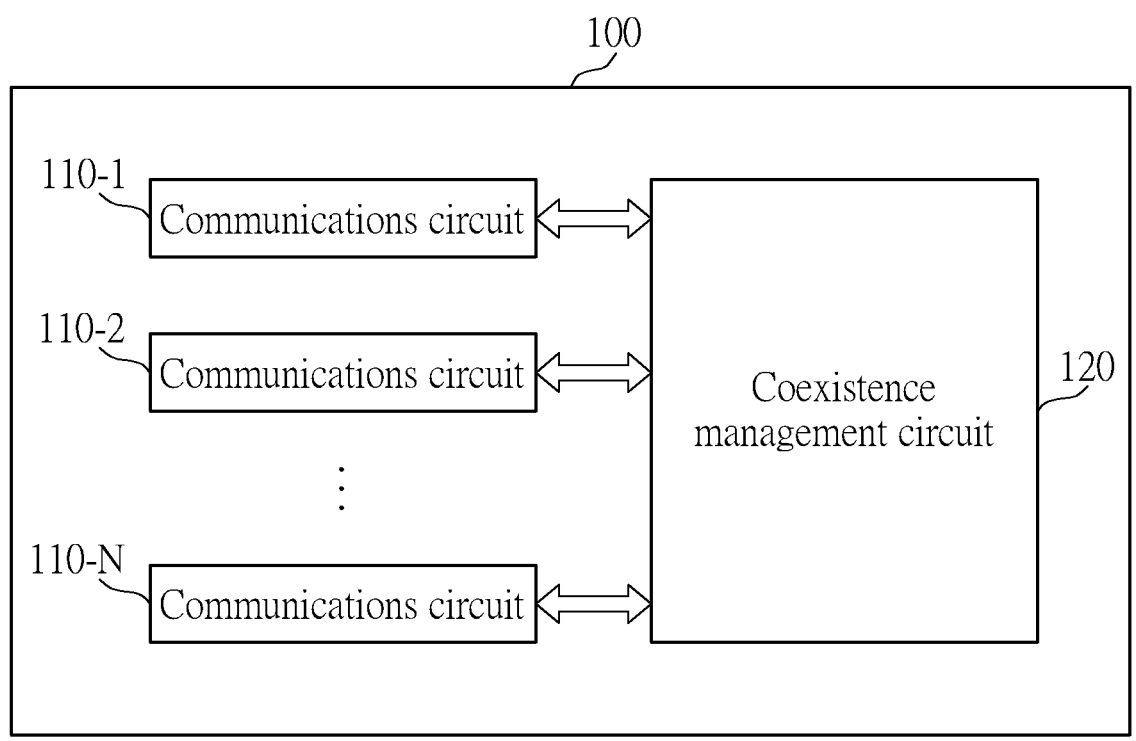
FIG. 1 is a block diagram of a communications apparatus according to an embodiment of the invention.

FIG. 1 is a block diagram of a communications apparatus according to an embodiment of the invention. The communications apparatus 100 may comprise at least a plurality of communications circuits 110-1, 110-2, . . . , 110-N and a coexistence management circuit 120. Each communications circuit is configured to provide one or more wireless communications services and may communicate with a peer communications apparatus (for example, a base station, a node-B, an eNB, an access point, or any other communications device) in a corresponding wireless network in compliance with a predetermined protocol of a predetermined Radio Access Technology (RAT). Note that although there are three communications circuits shown in FIG. 1, the invention should not be limited thereto. For example, in other embodiments of the invention, the communications apparatus 100 may also comprise less than or more than three communications circuits. Therefore, the invention should not be limited to any specific implementation method. Note further that FIG. 1 is a simplified block diagram of the proposed communications apparatus to give a clear illustration of the concept of the invention. In other embodiments of the invention, the communications apparatus 100 may further comprise other hardware circuits and/or components not shown in FIG. 1, and the invention should not be limited to what is shown in FIG. 1.

According to an embodiment of the invention, the coexistence management circuit 120 is coupled to the communications circuits, and is configured to manage radio activities of the communications circuits. Note that although the coexistence management circuit 120 shown in FIG. 1 is configured outside of the communications circuits, the invention should not be limited thereto. For example, in other embodiments of the invention, the coexistence management circuit 120 may also be configured inside of one communications circuit, or may be integrated into any internal controller or processor of one communications circuit. Therefore, the invention should not be limited to any specific implementation method.

In addition, note further that, in the embodiments of the invention, the communications circuits may be implemented in different chips and communicate with each other via a specific interface disposed therebetween, or two or more of the communications circuits may be integrated into one chip, such as an SoC (system on chip), and connect to each other by internal wires. Therefore, the invention should not be limited to any specific implementation method.

In the embodiments of the invention, the communications circuits co-located in the communications apparatus 100 may be a Wi-Fi communications circuit, a Bluetooth communications circuit, a 2G/3G/4G or LTE communications circuit, a 5G NR communications circuit, a Bluetooth Low Energy (BLE) communications circuit, a Bluetooth Long Range (BLR) communications circuit, or others, for providing the corresponding communications services in compliance with the corresponding protocols.

Figure 2:
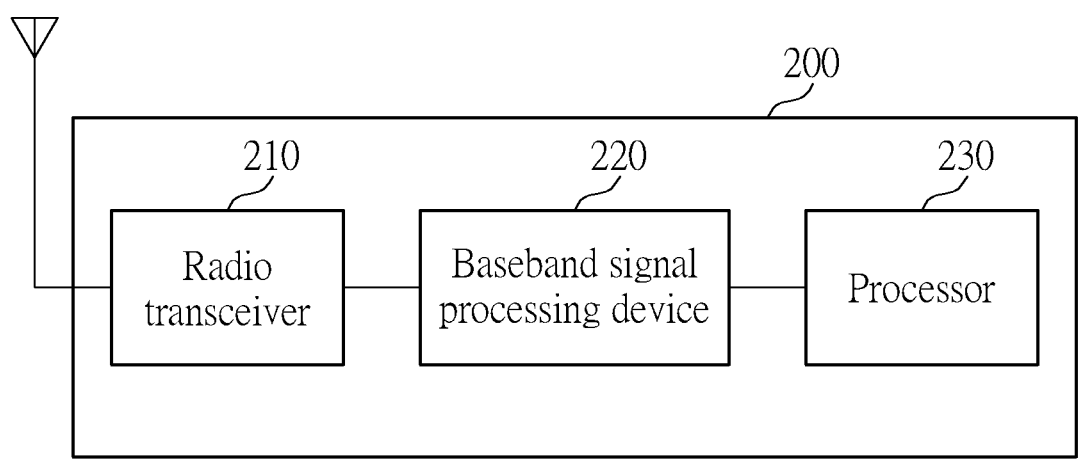
FIG. 2 is an exemplary block diagram of a communications circuit according to an embodiment of the invention.

FIG. 2 is an exemplary block diagram of a communications circuit according to an embodiment of the invention. The communications circuit 200 may comprise at least a radio transceiver 210, a baseband signal processing device 220, a processor 230 and an antenna module comprising at least one antenna. Note that, in order to clarify the concept of the invention, FIG. 2 presents a simplified block diagram in which only the elements relevant to the invention are shown. However, the invention should not be limited to what is shown in FIG. 2. For example, in some embodiments of the invention, the communications circuit 200 may further be extended to comprise more than one antenna, and the invention should not be limited to what is shown in FIG. 2.

The radio transceiver 210 is configured to transmit and receive wireless radio frequency (RF) signals. The radio transceiver 210 may comprise a RF signal processing device configured to receive RF signals via the antenna module and process the received RF signals to convert the received RF signals to baseband signals (that is, zero inter-medium frequency (IF) or low IF signals) to be processed by the baseband signal processing device 220, or receive baseband signals from the baseband signal processing device 220 and convert the received baseband signals to RF signals to be transmitted to a peer communications apparatus. The RF signal processing device may comprise a plurality of hardware elements to perform radio frequency conversion. For example, the RF signal processing device may comprise a power amplifier, a mixer, or others.

The baseband signal processing device 220 may process (for example, decode and demodulate) the baseband signals corresponding to the RF signals processed by the RF signal processing device to obtain information or data transmitted by the peer communications apparatus, and may process (for example, encode and modulate) uplink data to be transmitted to the peer communications apparatus as the baseband signals and provide the baseband signals to the RF signal processing device. The baseband signal processing device 220 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 230 may control the operations of the radio transceiver 210 (including the RF signal processing device) and the baseband signal processing device 220. According to an embodiment of the invention, the processor 230 may also be arranged to execute the program codes of the software module(s) of the corresponding baseband signal processing device 220 and/or the RF signal processing device.

Note that in some embodiments of the invention, the processor 230 may be integrated in the baseband signal processing device 220. Therefore, the invention should not be limited to any specific implementation method. Note further that, the communications circuit may further comprise other hardware circuits and/or components not shown in FIG. 2, and the invention should not be limited to what is shown in FIG. 2.

According to an embodiment of the invention, the communications circuits 110-1-110-N may perform a plurality of radio activities to transmit or receive wireless RF signals to or from an air interface and communicate with a peer communications apparatus. Here, the radio activities may comprise uplink radio activities and downlink radio activities. When a communications circuit determines or is scheduled to perform a radio activity, the communications circuit may issue a corresponding request to the coexistence management circuit to request or inform the coexistence management circuit about the occurrence of the radio activity. Therefore, each radio activity may be associated with a corresponding request. For example, the communications circuit may issue a transmission (TX) request to request or inform the coexistence management circuit about a forthcoming uplink radio activity. For another example, the communications circuit may issue a reception (RX) request to request or inform the coexistence management circuit about a forthcoming downlink radio activity. Note that, in some embodiments of the invention, the TX request and RX request may be the packet-based requests. That is, the communications circuit may schedule its radio activities per packet, and may issue the TX/RX request for requesting the corresponding radio activity to be taken place in the corresponding packet. In the embodiments of the invention, the packet may be a Bluetooth packet, a BLE packet, the Wi-Fi packet (such as the Wi-Fi physical layer protocol data unit (PPDU), or others.

Figure 10:
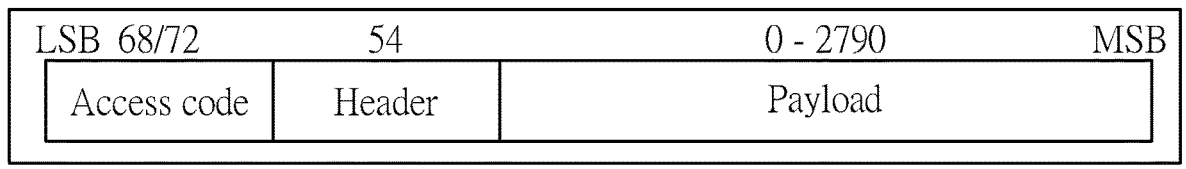
FIG. 10 is an exemplary packet format of a Bluetooth packet according to an embodiment of the invention.

FIG. 10 is an exemplary packet format of a Bluetooth packet according to an embodiment of the invention. The Bluetooth packet comprises access code, header and payload portions.

Figure 11:
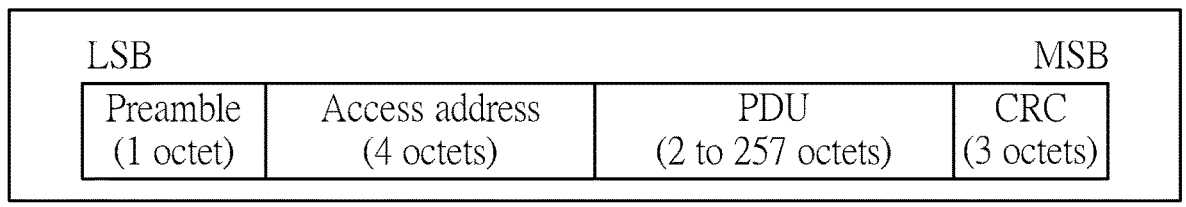
FIG. 11 is an exemplary packet format of a BLE packet according to an embodiment of the invention.

FIG. 11 is an exemplary packet format of a BLE packet according to an embodiment of the invention. The BLE packet comprises preamble, access address, Protocol Data Unit (PDU) and Cyclic Redundancy Check (CRC) portions.

Figure 12:
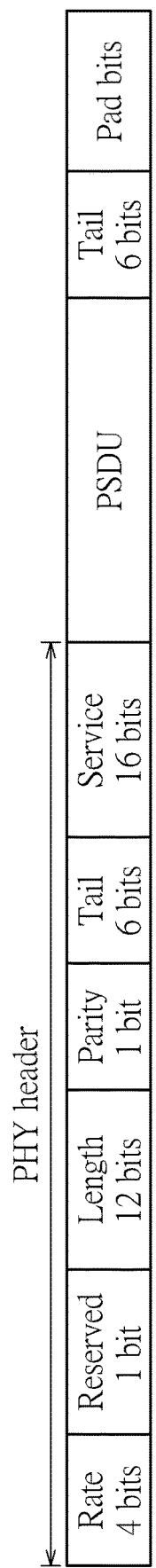
FIG. 12 is an exemplary packet format of a Wi-Fi PPDU according to an embodiment of the invention.

FIG. 12 is an exemplary packet format of a Wi-Fi PPDU according to an embodiment of the invention. The Wi-Fi PPDU comprises physical header (which comprising rate, reserved, length, parity, tail and service), Physical Service Data Unit (PSDU), tail and pad bits portions. Note that the format of the physical header (PHY header as shown) may be different for different physical data rates.

Figure 3:
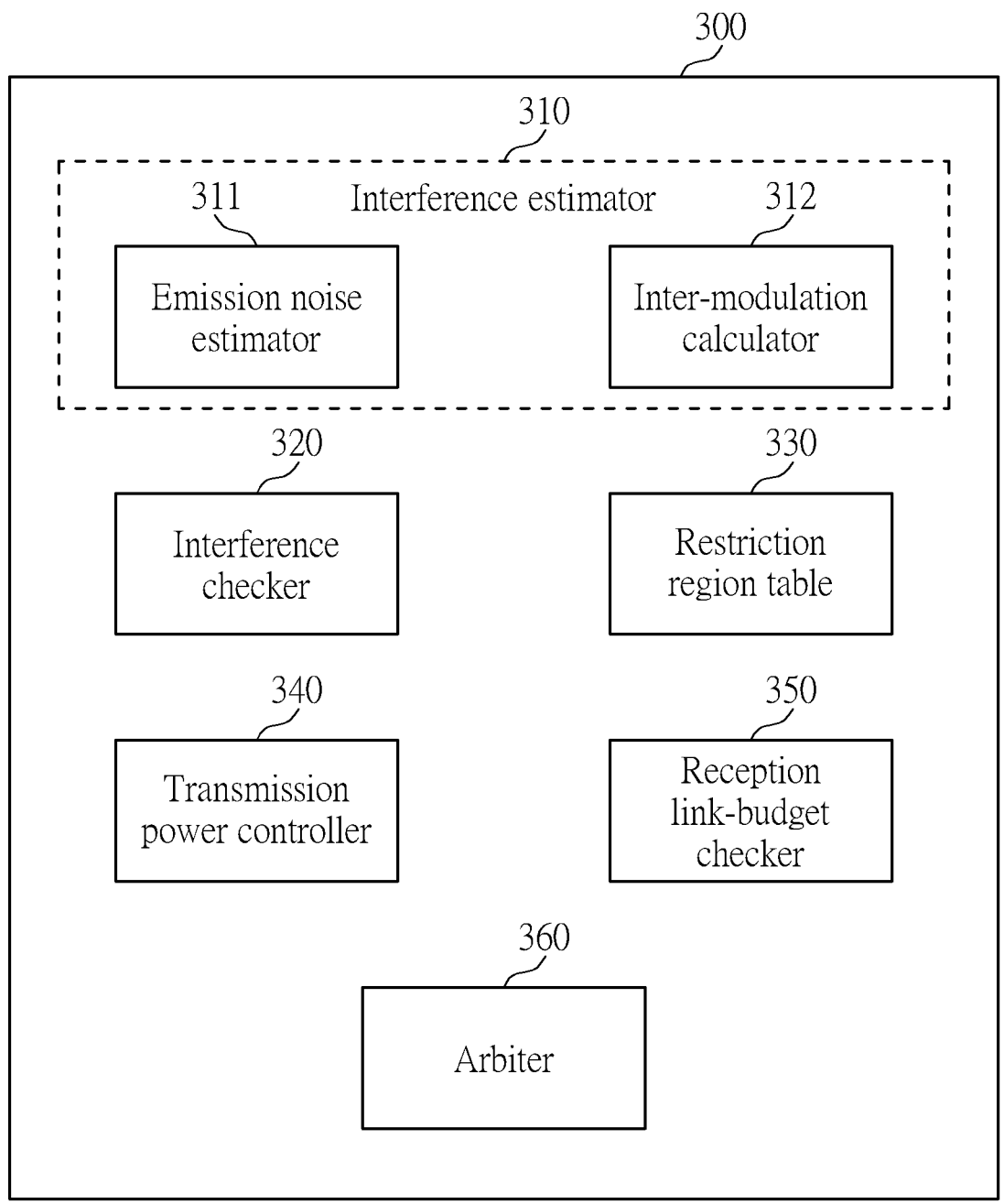
FIG. 3 is a block diagram of the coexistence management circuit according to an embodiment of the invention.

FIG. 3 is a block diagram of the coexistence management circuit according to an embodiment of the invention. According to an embodiment of the invention, to achieve intelligent interference mitigation or avoidance while maintaining simultaneous multi-RAT communications, the coexistence management circuit 120/300 is configured to detect whether at least two radio activities to occur or will occur in a subsequent packet time according to the latest received TX/RX requests. In response to a detection result of at least two radio activities to occur or will occur in a subsequent packet time, the coexistence management circuit 120/300 is configured to intelligently determine whether an interference signal related to or resulted from said at least two radio activities falls in a predetermined frequency band, and accordingly determine whether to adjust a transmission power or an execution time of one of said at least two radio activities.

Here, the interference signal may be an existing interference signal or an estimated or predicted interference signal. For example, when one radio activity is an ongoing uplink radio activity and another radio activity is a forthcoming downlink radio activity, the interference signal may be an existing interference signal which is induced by an emission signal of the ongoing uplink radio activity. For another example, when one radio activity is an ongoing or a forthcoming uplink radio activity and another radio activity is a forthcoming uplink radio activity, the interference signal may be an estimated or predicted inter-modulation signal which will be induced by the emission signals of the uplink radio activities when the signals of the uplink radio activities are transmitted or emitted at the same time.

According to an embodiment of the invention, when the interference signal falls in the predetermined frequency band, the coexistence management circuit 120/300 is configured to adjust a transmission power or an execution time of one of said at least two radio activities.

According to an embodiment of the invention, the coexistence management circuit 300 may comprise an interference estimator 310 and an interference checker 320. The interference estimator 310 is configured to estimate at least one of a frequency and a power of the interference signal related to said at least two radio activities that may occur at the same time in a subsequent packet time. The estimation of the at least one of frequency and power of the interference signal is according to at least one of an operating frequency band and a power of said at least two radio activities. The interference checker 320 is configured to obtain information regarding said at least one of the frequency and the power of the interference signal and information regarding the predetermined frequency band, and determine whether the interference signal falls in the predetermined frequency band according to the information.

According to an embodiment of the invention, the interference estimator 310 may further comprise an emission noise estimator 311 and an inter-modulation calculator 312. The emission noise estimator 311 is configured to estimate the power of the interference signal in the predetermined frequency band. For example, when one radio activity is an uplink radio activity associated with an TX request and another radio activity is a downlink radio activity associated with an RX request, the interference signal may be the emission signal of the uplink radio activity or the side lobe or the leakage of the emission signal, and the predetermined frequency band may be the reception frequency band of the downlink radio activity.

According to embodiments of the invention, the emission noise estimator 311 may estimate the power and the frequency of the interference signal according to one or more of the transmission frequency and transmission power of the emission signal, the reception frequency band, the reception bandwidth, the type of RAT and the filtering effect of the reception signal, and/or the isolation between the communications circuit performing the uplink radio activity and the communications circuit performing the downlink radio activity.

The inter-modulation calculator 312 is configured to estimate the frequency and the power of the interference signal. For example, when two radio activities that may occur at the same time in a subsequent packet time are both uplink radio activities, the interference signal may be the inter-modulation signal induced by the emission signals of the uplink radio activities (each being associated with a TX request).

According to an embodiment of the invention, the inter-modulation calculator 312 may estimate the frequency and the power of the interference signal according to the transmission frequency and transmission power of the emission signals and/or the isolation between the communications circuits transmitting the emission signals. In some embodiments of the invention, there may be a lookup table stored in an internal memory (not shown) of the inter-modulation calculator 312 or the coexistence management circuit 120/300, and information regarding the power of the interference signal may be obtained by looking up the content of the lookup table according to the frequency of the interference signal.

According to an embodiment of the invention, the coexistence management circuit 300 may further comprise a restriction region table 330. The restriction region table 330 may store the information regarding the restricted or forbidden frequency band with respect to different countries and information regarding the power criteria or requirement of the restricted or forbidden frequency band (for example, an upper bound or a lower bound). The restricted or forbidden frequency band and the corresponding power criteria or requirement may be configured in advanced according to the certification requirement of different countries. For example, the restricted or forbidden frequency band and the corresponding power criteria or requirement specified by the FCC may be stored in the restriction region table 330 with the corresponding country code.

The interference checker 320 may query the restriction region table 330 according to a country code of the country where the communications apparatus 100 is located to obtain information regarding the restricted or forbidden frequency band and information regarding the power criteria or requirement of the restricted or forbidden frequency band. Note that in some embodiments of the invention, the restricted or forbidden frequency band is the aforementioned predetermined frequency band (which is utilized to determine whether the interference signal falls within it). The interference checker 320 may further determine whether the interference signal falls in the predetermined frequency band and whether the power of the interference signal exceeds the power criteria or requirement of the restricted or forbidden frequency band according to the information obtained from the restriction region table 330.

According to an embodiment of the invention, the coexistence management circuit 300 may further comprise a transmission power controller 340. The transmission power controller 340 is configured to determine an amount of transmission power adjustment of said one of said at least two radio activities. According to an embodiment of the invention, the transmission power controller 340 is configured to determine the amount of transmission power adjustment for the radio activities associated with a latest transmission request. For example, when one radio activity is an ongoing uplink radio activity and another radio activity is a forthcoming uplink radio activity, the transmission power controller 340 is configured to determine the amount of transmission power adjustment for the forthcoming uplink radio activity.

In one embodiment of the invention, the transmission power controller 340 may determine the amount of transmission power adjustment for the forthcoming uplink radio activity according to the transmission power of the ongoing uplink radio activity. In another embodiment of the invention, the transmission power controller 340 may determine the amount of transmission power adjustment for the forthcoming uplink radio activity independently regardless of the transmission power of the ongoing uplink radio activity. In yet another embodiment of the invention, the transmission power controller 340 may determine the amount of transmission power adjustment for the forthcoming uplink radio activity according to a target signal to noise ratio (SNR) associated with an ongoing or a forthcoming downlink radio activity. In still another embodiment of the invention, the transmission power controller 340 may determine the amount of transmission power adjustment for an uplink radio activity according to the RSSI, the in-band noise, the SNR, the modulation scheme, the RX link-budget, or others of the uplink/downlink radio activity.

When the amount of transmission power adjustment for the forthcoming uplink radio activity is determined, information regarding the amount of transmission power adjustment may be transmitted to the corresponding communications circuit for the corresponding communications circuit to adjust is transmission power.

According to an embodiment of the invention, the coexistence management circuit 300 may further comprise a reception link-budget checker 350. The reception link-budget checker 350 is configured to check if a reception link-budget margin associated with a reception request is enough to allow the received signal to pass with respect to the interference signal. The reception link-budget is an indicator of quality of the received signal. According to an embodiment of the invention, the reception link-budget may be determined according to the Received Signal Strength Indicator (RSSI) of the received signal, the modulation or the modulation and coding scheme (MC S) adopted by the peer communications apparatus for generating the received signal, the in-band noise of the received signal (for example, the noise or interference falls in the reception frequency band of the received signal) and/or the SNR of the received signal.

When the RSSI or the SNR of the received signal is greater than a predetermined threshold, the modulation or the MCS is higher than a predetermined level and/or the in-band noise or the interference signal is lower than a predetermined noise threshold, the reception link-budget checker 350 may determine that the reception link-budget margin associated with the reception request is enough to allow the radio activity corresponding to the reception request to pass with respect to the interference signal.

According to an embodiment of the invention, the coexistence management circuit 300 may further comprise an arbiter 360. The arbiter 360 is configured to determine whether to adjust the transmission power of said one of said at least two radio activities or to adjust the execution time of said one of said at least two radio activities according to priorities of said at least two radio activities. In addition, when the reception link-budget margin associated with a reception request is determined as enough allow the radio activity corresponding to the reception request to pass with respect to the interference signal, the arbiter may determine not to adjust the transmission power and the execution time of other radio activities. When the reception link-budget margin associated with a reception request is determined as not enough to allow the radio activity corresponding to the reception request to pass with respect to the interference signal, the arbiter 360 may adjust the transmission power or the execution time of other radio activities.

According to an embodiment of the invention, whether to adjust the transmission power of a radio activity may be determined further according to a measured SNR and a target (required) SNR associated with a reception request. When the measured SNR is smaller than the target (required) SNR, adjusting the transmission power may be determined as required.

In addition, according to an embodiment of the invention, the way to adjust the execution time of a radio activity may comprise postponing executing (that is, delaying the execution time) of the radio activity, or directly aborting execution of the radio activity (for example, when the priority of this radio activity is lower than the others).

According to an embodiment of the invention, the arbiter 360 may be coupled to the communications circuits and may be further configured to transmit information regarding the amount of transmission power adjustment and/or the amount of execution time adjustment to the corresponding communications circuit for applying the corresponding adjustment.

Figure 4:
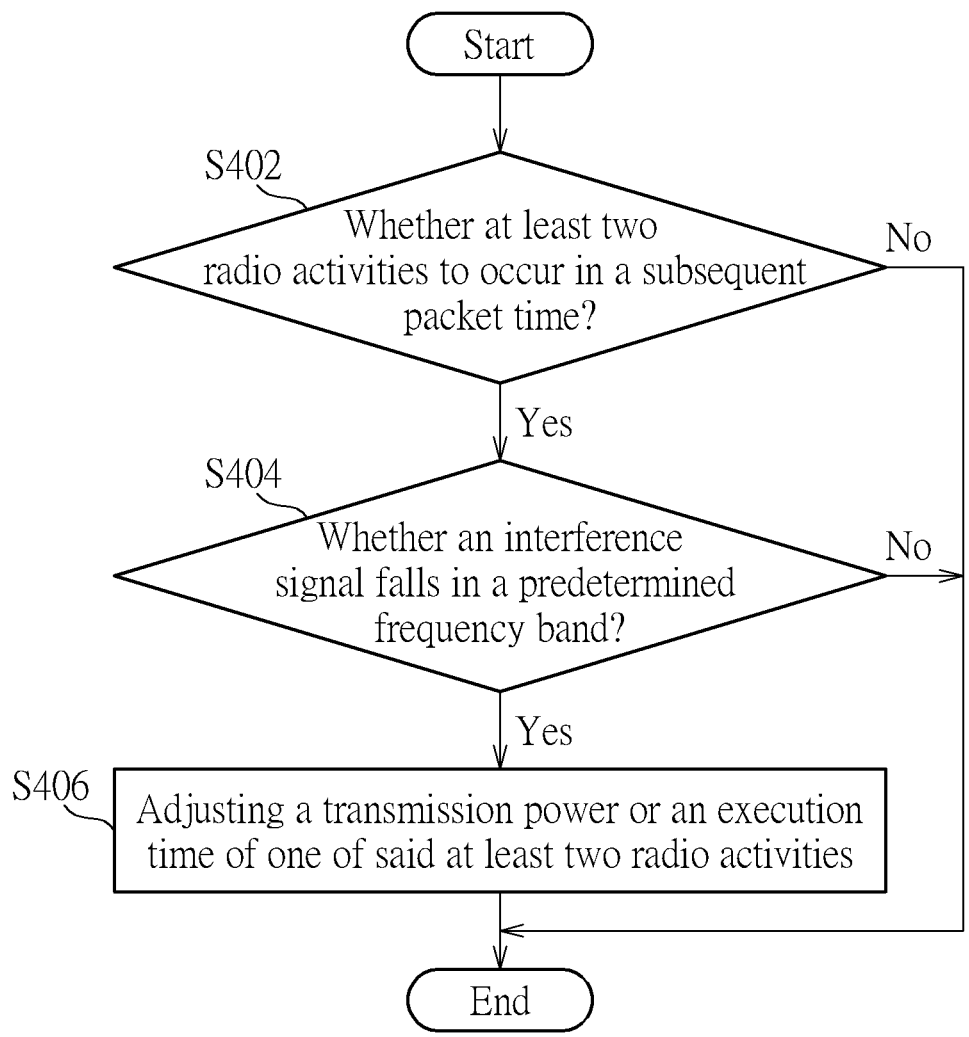
FIG. 4 is a flowchart of a method for mitigating interference in a communications apparatus capable of providing multi-RAT communications simultaneously according to an embodiment of the invention.

FIG. 4 is a flowchart of a method for mitigating interference in a communications apparatus which comprises a coexistence management circuit and a plurality of communications circuits and is capable of providing simultaneous multi-RAT communications according to an embodiment of the invention.

According to an embodiment of the invention, when a communications circuit determines or is scheduled to perform a radio activity, the communications circuit may issue a corresponding request to the coexistence management circuit to request or inform the coexistence management circuit about the occurrence of the radio activity. According to an embodiment of the invention, a TX request may comprise information regarding one or more of the transmission power, transmission frequency (frequency band), transmission bandwidth and a priority of the TX request, and an RX request may comprise information regarding one or more of the reception frequency (frequency band), reception bandwidth, the target (required) SNR and a priority of the RX request. In some embodiments of the invention, the communications circuit may further provide information regarding one or more of the RSSI, the measured SNR and the MCS associated with RX request of a downlink radio activity to the coexistence management circuit.

According to an embodiment of the invention, the value of the priority of each TX request and RX request may be previously defined and/or set to a corresponding default value.

In the embodiments of the invention, the method may be performed by the coexistence management circuit and comprise the following steps:

Step S402: Detecting whether at least two radio activities to occur in a subsequent packet time. According to an embodiment of the invention, the coexistence management circuit 120/300 or the arbiter 360 may detect whether at least two radio activities is about to or will occur at the same time in a subsequent packet time according to the TX/RX requests received from the communications circuits. If yes, step S404 is performed. If no, no further control may be performed.

Step S404: in response to a detection result of at least two radio activities to occur in the subsequent packet time, determining whether an interference signal related to said at least two radio activities falls in a predetermined frequency band. If yes, step S406 is performed. If no, no further control may be performed. In this manner, the radio activities requested by the communications circuit(s) may be sequentially performed.

It should be understood that in some embodiments of the invention, step S404 may be skipped. That is, regardless of whether an interference signal falls in a predetermined frequency band, step S406 will be performed when it is determined that at least two radio activities is about to or will occur at the same time in a subsequent packet time. It should be further understood that in some other embodiments of the invention, one more step of determining whether a reception link-budget margin associated with a reception request is enough to allow the radio activity corresponding to the reception request to pass with respect to the interference signal may be inserted between steps S404 and S406 or may be involved to replace step S404 in some scenarios.

As discussed above, indifference scenarios, the predetermined frequency band may have different meanings. As an example, when there are multiple uplink radio activities to occur simultaneously a subsequent packet time, the predetermined frequency band may be the restricted or forbidden frequency band of the country. When there is at least one downlink radio activity and one or more uplink radio activities to occur simultaneously a subsequent packet time, the predetermined frequency band may be the reception frequency band of the downlink radio activity.

Step S406: adjusting a transmission power or an execution time of one of said at least two radio activities.

In the embodiment of the invention, besides adjusting the transmission power or the execution time and managing the radio activities, the coexistence management circuit 120/300 or the arbiter 360 may keep detecting whether at least two radio activities to occur in a subsequent packet time.

Embodiments in different scenarios will be discussed in more detailed in the following paragraphs.

Figure 5:
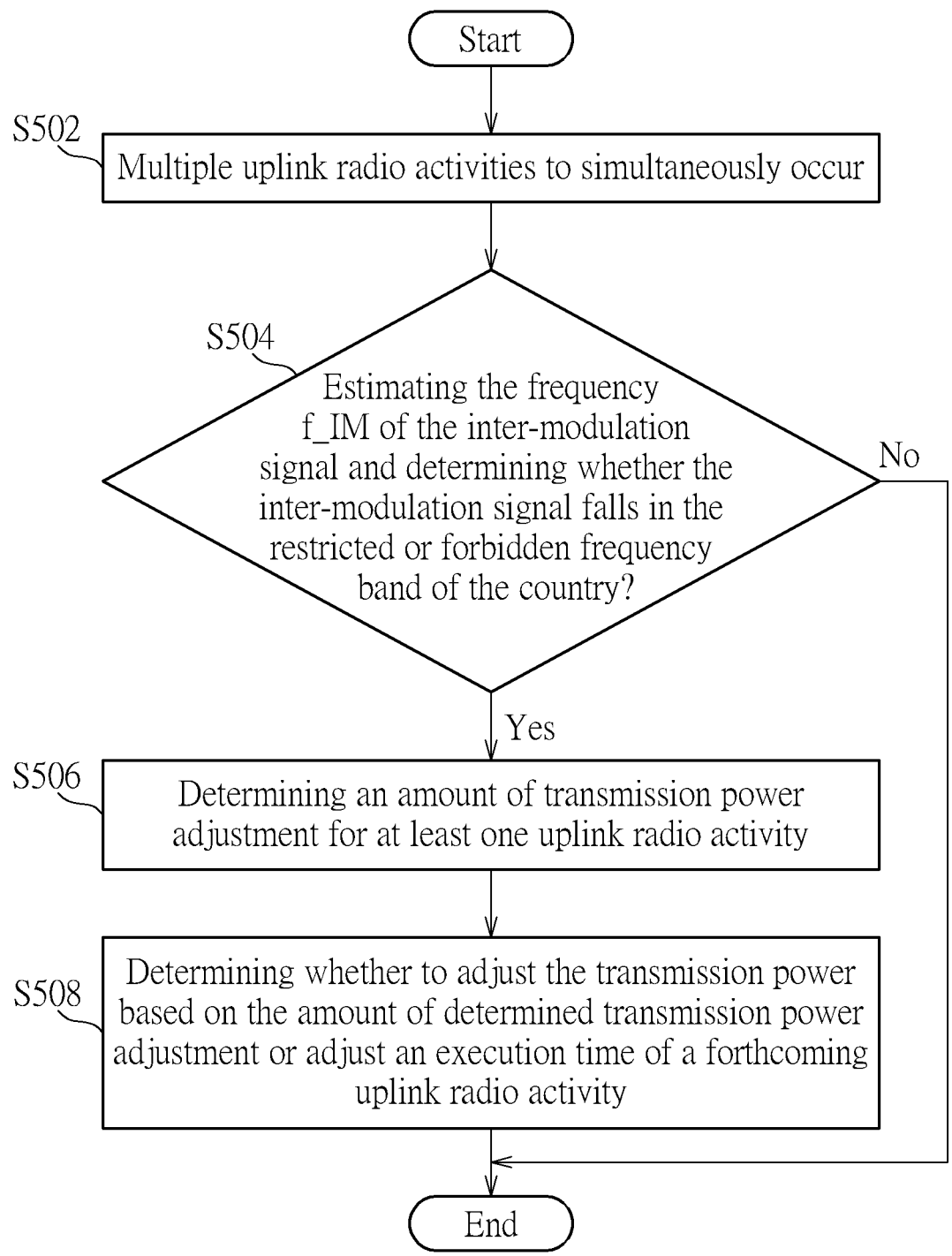
FIG. 5 is an exemplary flow chart of a method for mitigating interference in a communications apparatus according to a first embodiment of the invention.

FIG. 5 is an exemplary flow chart of a method for mitigating interference in a communications apparatus according to a first embodiment of the invention. In the first embodiment of the invention, the purpose of mitigating interference is for transmission regulation.

Step S502: detecting that in a subsequent packet time, multiple TX (that is, multiple uplink radio activities) will simultaneously occur. As discussed above, the uplink radio activities may be requested from the same chip or different chips.

Step S504: estimating the frequency f_IM and power of the inter-modulation signal induced by the emission signals of the uplink radio activities according to the transmission frequency and transmission power of the emission signals and/or the isolation between the communications circuits transmitting the emission signals, and determining whether the inter-modulation signal falls in the restricted or forbidden frequency band of the country and whether the power of the inter-modulation signal cannot satisfy the power criteria or requirement of the restricted or forbidden frequency band (for example, the power of the inter-modulation signal is greater than an upper bound). If the inter-modulation signal falls in the restricted or forbidden frequency band and the power of the inter-modulation signal cannot satisfy the power criteria or requirement of the restricted or forbidden frequency band, step S506 is performed. Otherwise, no further control may be performed and uplink radio activities requested by the communications circuit (s) may be simultaneously performed.

It should be noted that the restricted or forbidden frequency band checked in step S504 may be the restricted or forbidden frequency band of a specific region in the country or all regions in the country. It should be further noted that in some embodiments of the invention, step S504 may be directly skipped.

Step S506: determining an amount of transmission power adjustment for at least one uplink radio activity. According to an embodiment of the invention, the amount of transmission power adjustment may be determined for a forthcoming (that is, not yet performed) uplink radio activity or an uplink radio activity associated with a latest (the latest received) TX request.

In one embodiment of the invention, the transmission power controller 340 may determine the amount of transmission power adjustment according to the transmission power of an ongoing uplink radio activity or other uplink radio activities. In another embodiment of the invention, the transmission power controller 340 may determine the amount of transmission power adjustment independently regardless of the transmission power of any other uplink radio activity.

Step S508: determining whether to adjust the transmission power based on the amount of transmission power adjustment determined in step S506 or adjust an execution time of a forthcoming (that is, not yet performed) uplink radio activity (for example, postpone or abort uplink radio activity). In this manner, the uplink radio activities may be performed in a frequency division duplexing (FDD) or a time division duplexing (TDD) manner.

In one embodiment, when the transmission power of the forthcoming uplink radio activity or the transmission power of the uplink radio activity associated with the latest received TX request cannot be further reduced or the adjusted transmission power after applying the amount of transmission power adjustment is determined as improper (for example, the adjusted transmission power is too low or violates the power requirement as defined in the corresponding specifications), the arbiter 360 may determine to adjust the execution time instead of adjusting the transmission power of the forthcoming uplink radio activity.

Moreover, Step 506 and Step 508 may be combined in one step. That is, the invention is not limited to first determine the amount of transmission power adjustment and then determine whether to apply the transmission power adjustment. In one embodiment, the flow may first determine to adjust the transmission power and then determine the amount of the adjustment. Or, Step 508 may be prior to Step 506. In one embodiment, when one uplink radio activity has a high priority, the arbiter 360 may determine to adjust the execution time without determining the amount of transmission power adjustment.

Figure 6:
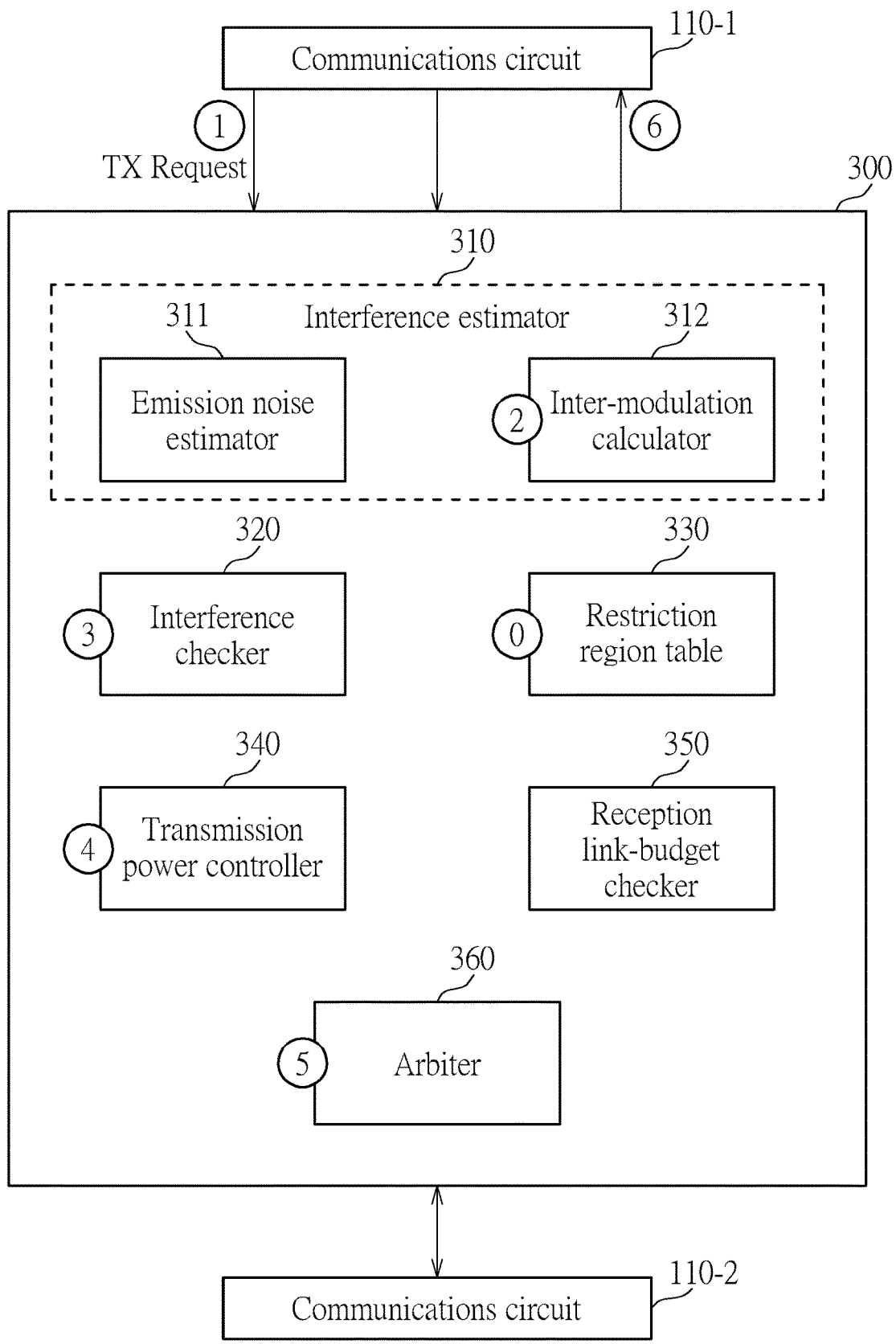
FIG. 6 is an exemplary block diagram showing the execution procedure of the method for mitigating interference according to the first embodiment of the invention.

FIG. 6 is an exemplary block diagram showing the execution procedure of the method for mitigating interference according to the first embodiment of the invention.

The restriction region table 330 may be first configured with required information according to the country where the communications apparatus 100 is located when the communications apparatus 100 is turned on (step 0).

When detecting that in a subsequent packet time multiple TX (that is, multiple uplink radio activities) will simultaneously occur according to the received TX requests (or, the asserted TX requests) (step 1), the inter-modulation calculator 312 may estimate the frequency and the power of the inter-modulation signal according to the transmission frequency and transmission power of the emission signals and/or the isolation between the communications circuits transmitting the emission signals (step 2).

The interference checker 320 is configured to obtain information regarding the frequency and the power of the inter-modulation signal from the inter-modulation calculator 312 and information regarding the restricted or forbidden frequency band and the power criteria or requirement of the restricted or forbidden frequency band from restriction region table 330, and determine whether the inter-modulation signal falls in the restricted or forbidden frequency band and the power of the inter-modulation signal cannot satisfy the power criteria or requirement of the restricted or forbidden frequency band (that is, whether the inter-modulation signal violates the regulation in the restricted or forbidden frequency band) (step 3).

The transmission power controller 340 is configured to determine an amount of transmission power adjustment for at least one forthcoming uplink radio activity (step 4). The transmission power controller 340 may determine the amount of transmission power adjustment for the transmission power to meet the power criteria or requirement of the restricted or forbidden frequency band after the adjustment.

The arbiter 360 is configured to obtain information regarding the amount of transmission power adjustment from the transmission power controller 340 and determine whether to adjust the transmission power or adjust an execution time of one or more forthcoming (that is, not yet performed) uplink radio activities (for example, postpone or abort uplink radio activity) (step 5). When the arbiter 360 determines to adjust the transmission power, the arbiter 360 may transmit information regarding the amount of transmission power adjustment to the corresponding communications circuit (Step 6).

According to an embodiment of the invention, if the arbiter 360 determines that the amount of transmission power adjustment (for example, power decrement) may be too large to cause a transmission failure or a sever transmission quality degradation, or the power criteria or requirement of the restricted or forbidden frequency band still cannot be met even after the power adjustment, the arbiter 360 may determine not to adjust the transmission power of a forthcoming uplink radio activity. Instead of reducing the transmission power, the arbiter 360 may determine to postpone or directly abort one or more uplink radio activities based on the corresponding priority. As an example, the low priority uplink radio activity may be directly aborted.

Figure 7:
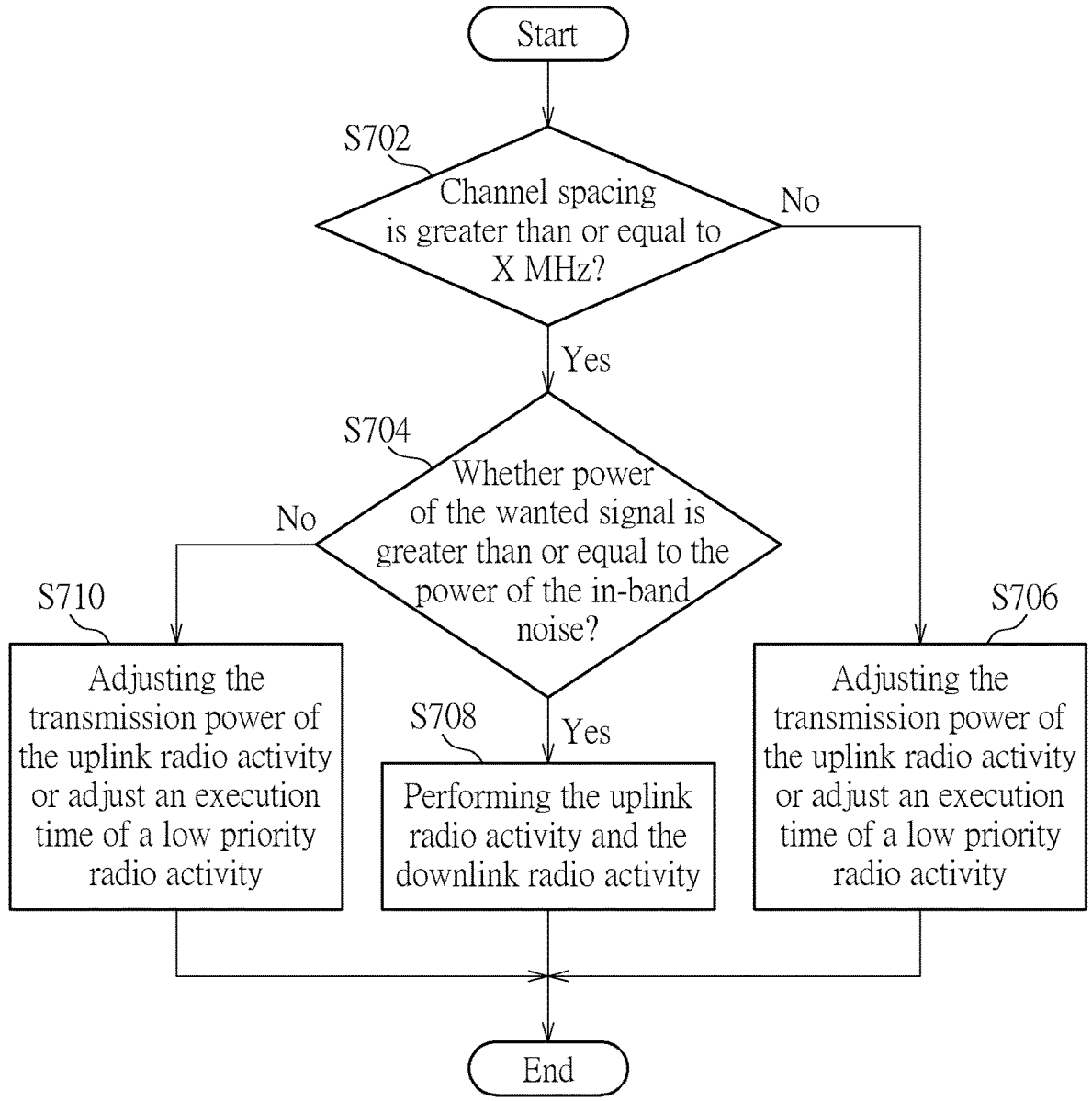
FIG. 7 is an exemplary flow chart of a method for mitigating interference in a communications apparatus according to a second embodiment of the invention.

FIG. 7 is an exemplary flow chart of a method for mitigating interference in a communications apparatus according to a second embodiment of the invention. In the second embodiment of the invention, the purpose of mitigating interference is for improving the receiving (RX) performance when one RX (that is, downlink radio activity) and one TX (that is, uplink radio activity) will simultaneously occur.

Step S702: determining whether the channel spacing or the frequency offset is greater than or equal to a predetermined threshold (for example, X MHz). Here, the channel spacing/frequency offset is the space or bandwidth or the difference between the transmission frequency of the uplink radio activity and the reception frequency of the downlink radio activity. If yes, step S704 is performed. If no, step S706 is performed. Note that in some embodiments of the invention, step S702 may be skipped.

Step S704: determining whether the power of the wanted signal associated with the downlink radio activity is greater than or equal to the power of the in-band noise inducted by the uplink radio activity. If yes, step S708 is performed. If no, step S710 is performed.

Step S706: Adjusting the transmission power of the uplink radio activity or adjust an execution time of a low priority radio activity (for example, postpone or abort the low priority radio activity). In this manner, the uplink radio activity and the downlink radio activity may be performed in a frequency division duplexing (FDD) or a time division duplexing (TDD) manner.

Step S708: Performing the uplink radio activity and the downlink radio activity. That is, the uplink radio activity and the downlink radio activity may be performed at the same time in a FDD manner.

Step S710: Adjusting the transmission power of the uplink radio activity or adjust an execution time of a low priority radio activity (for example, postpone or abort the low priority radio activity). In this manner, the uplink radio activity and the downlink radio activity may be performed in a FDD or TDD manner.

It should be noted that for the case when the uplink radio activity occurs earlier than the downlink radio activity, the determination in Step S704 may be made based on the expected power of the RX signal, the expected RX link-budget, the expected RX sensitivity, or others. For the case when the downlink radio activity occurs earlier than the uplink radio activity, the determination in Step S704 may be made based on the predicted in-band noise, the RSSI of the RX signal, the measured RX link-budget, or others.

Figure 8:
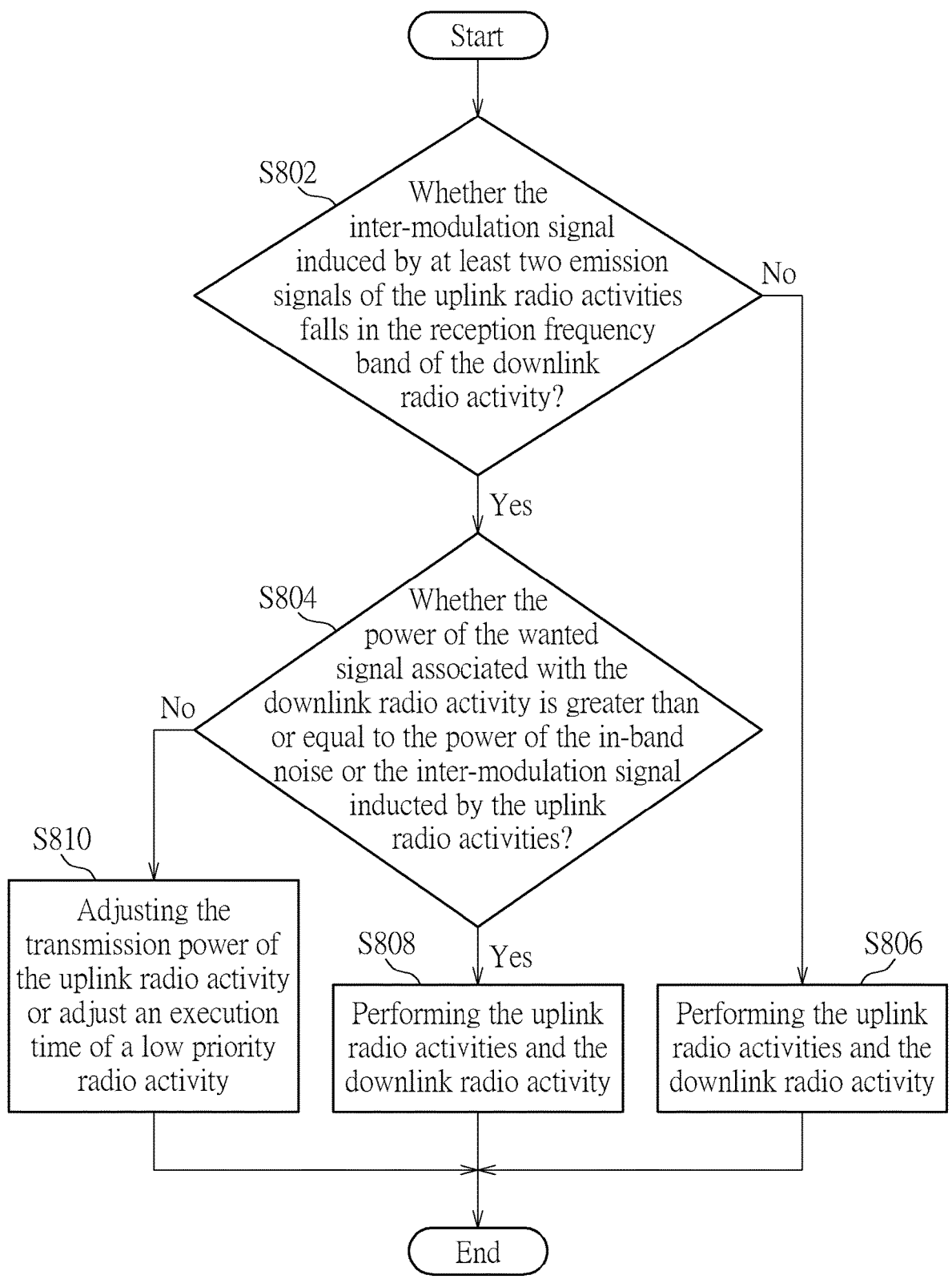
FIG. 8 is an exemplary flow chart of a method for mitigating interference in a communications apparatus according to a third embodiment of the invention.

FIG. 8 is an exemplary flow chart of a method for mitigating interference in a communications apparatus according to a third embodiment of the invention. In the third embodiment of the invention, the purpose of mitigating interference is for improving the receiving (RX) performance when one RX (that is, downlink radio activity) and multiple TX (that is, uplink radio activities) will simultaneously occur.

Step S802: determining whether the inter-modulation signal induced by at least two emission signals of the uplink radio activities falls in the reception frequency band of the downlink radio activity. If yes, step S804 is performed. If no, step S806 is performed. Note that in some embodiments of the invention, step S802 may be skipped.

Step S804: determining whether the power of the wanted signal associated with the downlink radio activity is greater than or equal to the power of the in-band noise or the inter-modulation signal inducted by the uplink radio activities. If yes, step S808 is performed. If no, step S810 is performed.

Step S806: performing the uplink radio activities and the downlink radio activity. That is, the uplink radio activities and the downlink radio activity may be performed at the same time in a FDD manner.

Step S808: performing the uplink radio activities and the downlink radio activity. That is, the uplink radio activities and the downlink radio activity may be performed at the same time in a FDD manner.

Step S810: adjusting the transmission power of the uplink radio activity or adjust an execution time of a low priority radio activity (for example, postpone or abort the low priority radio activity). In this manner, the uplink radio activities and the downlink radio activity may be performed in a FDD or a TDD manner.

It should be noted that for the case when any uplink radio activity occurs earlier than the downlink radio activity, the determination in Step S804 may be made based on the expected power of the RX signal, the expected RX link-budget, the expected RX sensitivity, or others. For the case when the downlink radio activity occurs earlier than the uplink radio activities, the determination in Step S804 may be made based on the predicted in-band noise, the predicted inter-modulation signal, the RSSI of the RX signal, the measured RX link-budget, or others.

Figure 9:
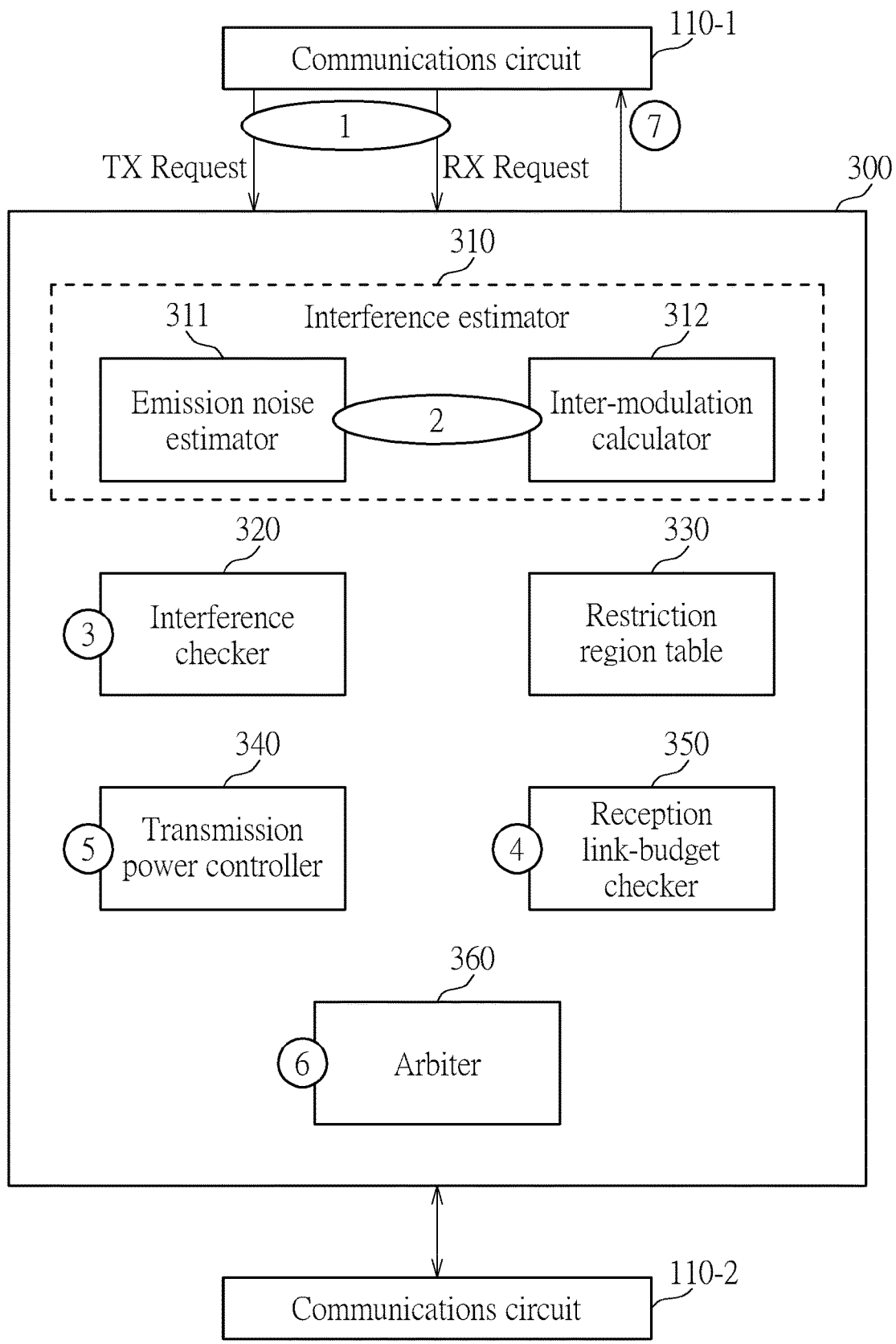
FIG. 9 is an exemplary block diagram showing the execution procedure of the method for mitigating interference according to the second/third embodiment of the invention.

FIG. 9 is an exemplary block diagram showing the execution procedure of the method for mitigating interference according to the second/third embodiment of the invention.

When detecting that in a subsequent packet time at least one RX (that is, downlink radio activity) and one or more TX (that is, one or more uplink radio activities) will simultaneously occur according to the received RX request and TX request(s) (or, the asserted RX request and TX request(s)) (step 1), the interference estimator 310 may estimate the frequency and the power of the emission signal or the inter-modulation signal (hereinafter collectively called the interference signal) according to the transmission frequency and transmission power of the emission signal (s) and/or the isolation between the corresponding communications circuits (step 2).

The interference checker 320 is configured to obtain information regarding the frequency and the power of the interference signal from the interference estimator 310, and determine whether the interference signal falls in the reception frequency band of the downlink radio activity (step 3).

The reception link-budget checker 350 is configured to check if a reception link-budget margin associated with the RX request is enough to allow the radio activity corresponding to the reception request to pass with respect to the interference signal (step 4).

The transmission power controller 340 is configured to determine an amount of transmission power adjustment for at least one forthcoming uplink radio activity (step 5). The transmission power controller 340 may determine the amount of transmission power adjustment according to the reception link-budget margin.

The arbiter 360 is configured to obtain information regarding the amount of transmission power adjustment from the transmission power controller 340, information regarding the reception link-budget and/or information regarding whether the reception link-budget margin associated with the RX request is enough to allow the radio activity corresponding to the reception request to pass with respect to the interference signal from the reception link-budget checker 350 and determine whether to adjust the transmission power or adjust an execution time of one or more forthcoming (that is, not yet performed) uplink radio activities (for example, postpone or abort uplink radio activity) (step 6).

When the reception link-budget margin associated with the reception request is determined as not enough to allow the radio activity corresponding to the reception request to pass with respect to the interference signal, the arbiter 360 may determine to adjust the transmission power or the execution time of other radio activities. When the arbiter 360 determines to adjust the transmission power, the arbiter 360 may transmit information regarding the amount of transmission power adjustment to the corresponding communications circuit (Step 7).

According to an embodiment of the invention, if the arbiter 360 determines that the amount of transmission power adjustment (for example, power decrement) may be too large to cause a transmission failure or a sever transmission quality degradation, or the reception performance is still not good enough even after the power adjustment, the arbiter 360 may determine not to adjust the transmission power of a forthcoming uplink radio activity. Instead of reducing the transmission power, the arbiter 360 may determine to postpone or directly abort one or more uplink radio activities based on the corresponding priority. As an example, the low priority uplink radio activity may be directly aborted.

Based on the proposed method and communications apparatus, the problem of violating the certification requirement or the regulation in the restricted or forbidden frequency band cause by the inter-modulation signal can be solved. When the communications apparatus can satisfy the power criteria or requirement of the restricted or forbidden frequency band and pass the certification requirement or the regulation of a country, the communications apparatus can be vended and used in the corresponding country. In addition, the RX performance and/or the TX performance can be greatly improved when at least two radio activities are performed at the same time. For example, by adequately adjusting the transmission power of an uplink radio activity which may induce in-band noise to a downlink signal, the RX performance can be greatly improved. In addition, when determining that the reception link-budget margin of a downlink radio activity is enough to allow the radio activity corresponding to the reception request to pass with respect to the interference signal, the transmission power of an uplink radio activity can be increased and the TX performance can be greatly improved. In addition, since the proposed coexistence management circuit is introduced to manage the radio activities associated with the packet-based requests, per packet optimization (that is, per packet interference mitigation and per packet TX/RX performance optimization) can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications apparatus, comprising:
   a plurality of communications circuits, each being configured to provide wireless communications services in compliance with a protocol;
   a coexistence management circuit, configured to manage radio activities of the communications circuits, wherein in response to a detection result of at least two radio activities to occur in a subsequent packet time, the coexistence management circuit is configured to determine whether an interference signal related to said at least two radio activities falls in a predetermined frequency band being a restricted or forbidden frequency band of a particular country, and when the interference signal falls in the predetermined frequency band, the coexistence management circuit is configured to adjust a transmission power or an execution time of one of said at least two radio activities; and
   an arbiter, configured to determine whether to adjust the transmission power of said one of said at least two radio activities or to adjust the execution time of said one of said at least two radio activities, wherein the arbiter determines to adjust the execution time of said one of said at least two radio activities when adjusting the transmission power cannot meet a power criteria of the predetermined frequency band;
   wherein the communications apparatus comprises a table detailing restricted and forbidden frequency bands of countries.

2. The communications apparatus of claim 1, wherein the coexistence management circuit comprises:
   an interference estimator, configured to estimate at least one of a frequency and a power of the interference signal according to at least one of an operating frequency band and a power of said at least two radio activities; and
   an interference checker, configured to obtain information regarding said at least one of the frequency and the power of the interference signal and information regarding the predetermined frequency band, and determine whether the interference signal falls in the predetermined frequency band.

3. The communications apparatus of claim 2, wherein the interference estimator comprises:
   an emission noise estimator, configured to estimate the power of the interference signal in the predetermined frequency band, wherein the interference signal is induced by an emission signal associated with a transmission request and the predetermined frequency band is a reception frequency band associated with a reception request; or
   an inter-modulation calculator, configured to estimate the frequency and the power of the interference signal, wherein the interference signal is an inter-modulation signal induced by at least two emission signals each being associated with a transmission request.

4. The communications apparatus of claim 1, wherein the coexistence management circuit further comprises:
   a transmission power controller, configured to determine an amount of transmission power adjustment of said one of said at least two radio activities, wherein said one of said at least two radio activities is associated with a latest transmission request.

5. The communications apparatus of claim 1, wherein the coexistence management circuit further comprises:
   a reception link-budget checker, configured to check if a reception link-budget margin associated with a reception request is enough to allow the radio activity corresponding to the reception request to pass with respect to the interference signal, wherein when the reception link-budget margin is determined to not be enough to allow the radio activity corresponding to the reception request to pass with respect to the interference signal, the coexistence management circuit is configured to adjust the transmission power or the execution time of said one of said at least two radio activities.

6. The communications apparatus of claim 1, wherein the arbiter adjusts the execution time of said one of said at least two radio activities according to transmission priorities of said at least two radio activities.

7. The communications apparatus of claim 6, wherein the arbiter is further configured to determine whether to adjust the transmission power of said one of said at least two radio activities according to a measured signal to noise ratio (SNR) and a target SNR associated with a reception request.

8. A method for mitigating interference in a communications apparatus comprising a plurality of communications circuits each being configured to provide wireless communications services in compliance with a protocol, comprising:
   detecting whether at least two radio activities to occur in a subsequent packet time;
   in response to a detection result of at least two radio activities to occur in the subsequent packet time, determining whether an interference signal related to said at least two radio activities falls in a predetermined frequency band being a restricted or forbidden frequency band of a particular country; and
   when the interference signal falls in the predetermined frequency band, adjusting a transmission power or an execution time of one of said at least two radio activities;
   wherein the communications apparatus comprises a table detailing restricted and forbidden frequency bands of countries, and it is determined to adjust the execution time of one of said at least two radio activities when adjusting the transmission power cannot meet a power criteria of the predetermined frequency band.

9. The method of claim 8, further comprising:
   estimating at least one of a frequency and a power of the interference signal according to at least one of an operating frequency band and a power of said at least two radio activities; and
   determining whether the interference signal falls in the predetermined frequency band according to information regarding said at least one of the frequency and the power of the interference signal and information regarding the predetermined frequency band.

10. The method of claim 9, wherein the step of estimating at least one of the frequency and the power of the interference signal according to at least one of the operating frequency band and the power of said at least two radio activities further comprises:
   when the interference signal is induced by an emission signal associated with a transmission request, estimating the power of the interference signal in the predetermined frequency band, wherein the predetermined frequency band is a reception frequency band associated with a reception request; or
   when the interference signal is an inter-modulation signal induced by at least two emission signals each being associated with a transmission request, estimating the frequency and the power of the interference signal.

11. The method of claim 8, further comprising:
determining an amount of transmission power adjustment of said one of said at least two radio activities, wherein said one of said at least two radio activities is associated with a latest transmission request.

12. The method of claim 8, further comprising:
determining whether a reception link-budget margin associated with a reception request is enough to allow the radio activity corresponding to the reception request to pass with respect to the interference signal; and
when the reception link-budget margin is determined to not be enough to allow the radio activity corresponding to the reception request to pass with respect to the interference signal, adjusting the transmission power or the execution time of said one of said at least two radio activities.

13. The method of claim 8, further comprising:
determining whether to adjust the transmission power of said one of said at least two radio activities or to adjust the execution time of said one of said at least two radio activities according to transmission priorities of said at least two radio activities.

14. The method of claim 13, wherein whether to adjust the transmission power of said one of said at least two radio activities is determined further according to a measured signal to noise ratio (SNR) and a target SNR associated with a reception request.

15. The method of claim 13, wherein the step of adjusting the transmission power or the execution time of said one of said at least two radio activities further comprises:
postponing executing or aborting said one of said at least two radio activities.

16. A communications apparatus, comprising:
a plurality of communications circuits, each being configured to provide wireless communications services in compliance with a protocol; and
a coexistence management circuit, configured to manage radio activities of the communications circuits, wherein in response to a detection result of at least two radio activities to occur in a subsequent packet time, the coexistence management circuit is configured to determine whether an interference signal related to said at least two radio activities falls in a predetermined frequency band being a restricted or forbidden frequency band of a particular country, and when the interference signal falls in the predetermined frequency band, the coexistence management circuit is configured to adjust a transmission power or an execution time of one of said at least two radio activities;
wherein the communications apparatus comprises a table detailing restricted and forbidden frequency bands of countries.

17. A method for mitigating interference in a communications apparatus comprising a plurality of communications circuits each being configured to provide wireless communications services in compliance with a protocol, comprising:
detecting whether at least two radio activities to occur in a subsequent packet time;
in response to a detection result of at least two radio activities to occur in the subsequent packet time, determining whether an interference signal related to said at least two radio activities falls in a predetermined frequency band being a restricted or forbidden frequency band of a particular country; and
when the interference signal falls in the predetermined frequency band, adjusting a transmission power or an execution time of one of said at least two radio activities;
wherein the communications apparatus comprises a table detailing restricted and forbidden frequency bands of countries.

\* \* \* \* \*